No. 877,628. PATENTED JAN. 28, 1908.
S. BENSON.
NUT LOCK.
APPLICATION FILED JUNE 23, 1906.
Fig. 2.   Fig. 1.
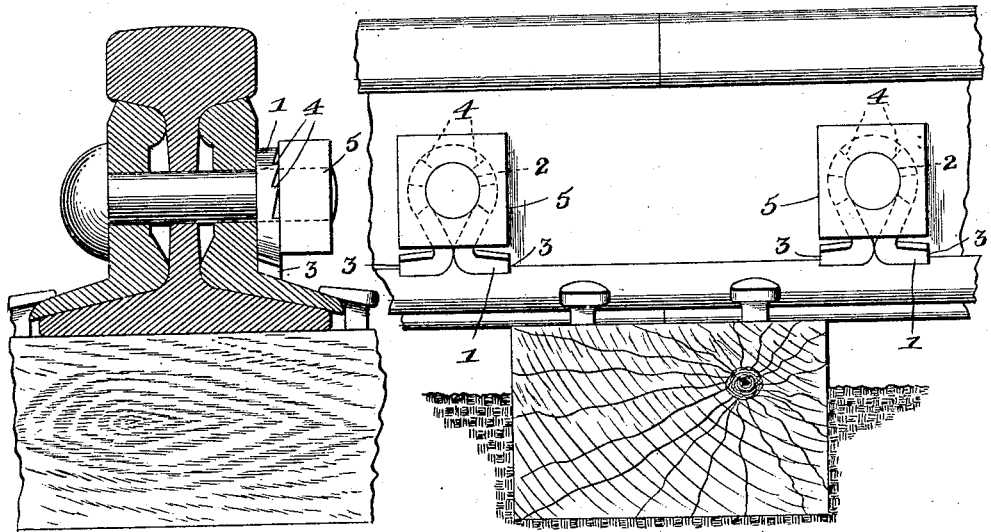
Fig. 3.
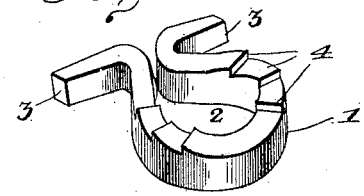
Fig. 4.   Fig. 5.
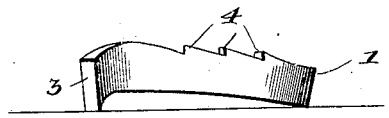   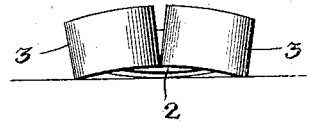
WITNESSES:
Sivert Benson,
INVENTOR,
By
ATTORNEYS

UNITED STATES PATENT OFFICE.

SIVERT BENSON, OF SPRING VALLEY, MINNESOTA, ASSIGNOR OF ONE-THIRD TO WILLIAM B. HUTTON AND ONE-THIRD TO RALPH J. PARKER, OF SPRING VALLEY, MINNESOTA.

NUT-LOCK.

No. 877,628.  Specification of Letters Patent.  Patented Jan. 28, 1908.

Application filed June 23, 1906. Serial No. 323,095.

*To all whom it may concern:*

Be it known that I, SIVERT BENSON, a citizen of the United States, residing at Spring Valley, in the county of Fillmore and State of Minnesota, have invented a new and useful Nut-Lock, of which the following is a specification.

This invention has relation to nut locks and it consists in the novel construction and arrangement of its parts as hereinafter shown and described.

The object of this invention is to provide a nut lock which shall also supply the space and perform the functions of a washer, to render the same more effective and reliable in operation than those heretofore used and to secure other advantageous results.

A further object of the invention is to provide a nut lock having a certain amount of spring or resiliency, the spring member being so shaped that the nut will bear squarely against the same and evenly impinge the said member against the backing. That is to say the spring member will not exercise greater tension against one side of the nut than the other side. The said spring member is also provided with spurs which are adapted to engage the under face of the nut.

In the accompanying drawing:—Figure 1 is a side elevation of the ends of rails showing the nut lock applied thereto. Fig. 2 is a transverse sectional view of a rail and fish plates showing the nut lock applied thereto. Fig. 3 is a perspective view of the spring member. Fig. 4 is an edge elevation of the spring member. Fig. 5 is an end elevation of the spring member.

The spring member 1 is made of spring steel. The middle portion 2 thereof is substantially circular while the end portions 3, 3 extend substantially tangentially with relation to the said circular middle portion. The middle portion 2 is non-volute and is adapted to fit snugly about a bolt. The spring member 1 thus formed is curved along its longitudinal axis as illustrated in Fig. 4 of the drawing so that normally the ends of the portions 3, 3 and the middle of the portion 2 will rest upon the backing such as a fish plate. The longitudinal axis of the member 1 is considered to be a line erected at right angles to the lower edges of the end portions 3, 3 and medially of the ends thereof and coincident with the radius of the middle portion 2. Also by referring to Fig. 5, it will be observed that the inner ends of the portions 3, 3 are in a higher plane than the outer ends thereof, and that the said ends lie in the arc of the same circle. This is due partly to the longitudinal curving of the spring member and also due to the fact that the longitudinal axis of the said portions 3, 3 are inclined at a slight angle to a horizontal. The upper edge of the central portion 2 is provided with the spurs 4, 4 which are adapted to engage the under face of the nut 5 when the same is secured against the member 1. It will thus be seen that a nut locking member is provided which may be applied to a bolt and nut without altering the construction of the same in any respect. Also that when the nut 5 is screwed down upon the bolt that the spring member 1 does not exert tension to a greater degree on one portion of the face of the nut than upon another. That is to say there is no tendency on the part of the spring member to twist the thread of the nut with relation to the thread of the bolt and that the nut may move in true parallel relation along the longitudinal axis of the bolt.

With this form of spring member, there is no danger of the said spring member working into the perforations of a fish plate and consequently no washers have to be used in connection with the nut lock.

I am aware that nut locks have been patented, for instance that patented to D. O. Ward, September 1, 1901, #458,782, in which the general outline of the spring member is somewhat similar to my construction but my construction differs and possesses advantages in that no portions of the spring member are twisted laterally and consequently the spring member bears in lines against the face of the nut instead of at points and presents a more efficient locking surface.

Having described my invention, what I claim as new and desire to secure by Letters Patent is:—

A nut lock comprising a spring steel member having a substantially circular and non-volute middle portion with extended ends, said middle portion having spurs located upon its nut engaging edge, said spring member being curved along its longitudinal axis, the extending ends being curved transversely of the member and lying in the arc of the same circle.

In testimony that I claim the foregoing as my own, I have hereto affixed my signature in the presence of two witnesses.

SIVERT BENSON.

Witnesses:
 E. M. EDWARDS,
 R. E. SHEPHARD.